Patented Oct. 5, 1948

2,450,706

UNITED STATES PATENT OFFICE 2,450,706

METHYLATION OF METHYL 6-HYDROXY-DEHYDROABIETATE

Harold H. Zeiss, Fairlawn-Radburn, N. J., assignor to Ridbo Laboratories, Inc., Paterson, N. J., a corporation of New Jersey No Drawing. Application June 14, 1946, Serial No. 676,868

5 Claims. (Cl. 260—97)

1

This invention relates to a process for methylating methyl 6-hydroxydehydroabietate, which is commonly represented by the following structural formula:

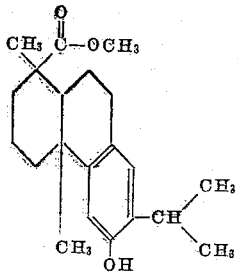

Methylation of this compound has been performed heretofore by reacting the compound with dimethyl sulfate in an ethereal solution of methylmagnesium chloride. The methylated compound (methyl 6-methoxydehydroabietate) has been used for various purposes, for instance, as an intermediate in making a number of other compounds.

It has also been attempted to methylate methyl 6-hydroxydehydroabietate with dimethyl sulfate in alcoholic alkali solution, but this has not heretofore proven successful, and apparently it was believed that the difficulty encountered in this methylation was attributable to steric hindrance exerted by the adjacent isopropyl group.

I have found that methylation of methyl 6-hydroxydehydroabietate may be effected with ease and rapidity with dimethyl sulfate in an aqueous alcoholic alkali solution.

In the preferred practice of this invention the alcohol-to-water ratio should be in the general neighborhood of 50–50 (by volume). If the amount of water present is excessive, the methyl 6-hydroxydehydroabietate may precipitate before the reaction occurs. On the other hand, extensive decrease of water below 50% tends to decrease the yield and to retard or hinder the reaction.

The total quantity of the aqueous alcohol solution should be at least sufficient to secure a clear solution of the methyl 6-hydroxydehydroabietate at room temperature. Some excess of the solution beyond that needed to secure a clear solution is not objectionable, although a large excess may retard or interfere with the recovery of the methylated product.

The alcohol to be used must be miscible with water in the concentration contemplated, for instance, the lower water soluble alcohol homologues, such as methyl, ethyl, propyl and isopropyl alcohols. Ethyl alcohol is preferred. The alkali to be used in the solution should be a hydroxide of an alkali metal, advantageously sodium or potassium hydroxide. The quantity of the alkali to be employed should be at least equal to theory, i. e., one mol for each mol of methyl 6-hydroxydehydroabietate. A slight excess is preferred, for instance, about 1.1 mols although the quantity should not exceed 1.5 mols for each mol of the starting material.

The quantity of dimethyl sulfate to be employed should also at least equal theory, i. e., one-half mol of dimethyl sulfate for each mol of methyl 6-hydroxydehydroabietate. Preferably at least one mol of dimethyl sulfate is employed for each mol of the starting material, since only one of the methyl groups of the dimethyl sulfate reacts with ease. About 1.2 mols of dimethyl sulfate for each mol of the starting material has been found highly effective.

In carrying out the process of the invention I prefer to proceed as follows:

First, the methyl 6-hydroxydehydroabietate is dissolved in the alcohol to be employed, the alcohol being warmed if desired to facilitate solution. The aqueous alkali solution is advantageously separately prepared and these two solutions are then mixed.

The dimethyl sulfate is then added to the mixed solution, preferably at or near room temperature and the entire batch is agitated for several minutes.

The batch is then heated to refluxing temperature, which, with a 50–50 water-ethyl-alcohol solution is about 80° C. The time required at refluxing temperature to effect the reaction is not long, an hour or two being ample to secure a very good yield.

At the end of the refluxing period an alkali such as sodium hydroxide is added to the solution to destroy any excess dimethyl sulfate present.

The batch is then cooled and the product recovered, recovery advantageously being effected in one or the other of the two ways referred to herebelow.

According to one method for recovery, direct filtration of the insoluble methyl 6-methoxydehydroabietate is effected and the product is dissolved in ethyl alcohol. With the alcohol solution at or close to the boiling temperature, water is added "to turbidity" and the solution is then cooled to effect crystallization. The methyl 6-methoxydehydroabietate appears as broad white plate crystals. The mother liquor may be repeatedly concentrated and repeatedly cooled to obtain further yield.

According to another method for recovery, the solution after the refluxing treatment is heated to effect distillation or evaporation of most of the alcohol; and one may then extract with a solvent which is selective with respect to methyl 6-methoxydehydroabietate, for instance, ether. The ether solution is then washed with water to free it of alkali; and the ether is then replaced with an alcohol such as ethyl alcohol, this being effected by adding the ethyl alcohol and warming to evaporate the ether. Thereafter, the product may be crystallized from the ethyl alcohol solution in the manner described above.

From the above it will be obvious that the process of the invention is also effective with the ethyl ester of dehydroabietic acid, as well as with the methyl ester, to form ethyl 6-methoxydehydroabietate; and further that diethyl sulfate may be substituted in the process in place of dimethyl sulfate, in which latter event, the product would, of course, be the homologous ether, i. e., the ester of 6-ethoxydehydroabietic acid.

The following is given as an example:

To a solution of 3 g. of methyl 6-hydroxydehydroabietate (M. P. 158–159°) in 60 ml. of ethanol and 42.5 ml. of 1% aqueous sodium hydroxide, 1 g. of dimethyl sulfate is added at room temperature and the turbid mixture refluxed for two and one-half hours. Ten ml. of 12% aqueous sodium hydroxide is then added to destroy the excess dimethyl sulfate. After distilling off the alcohol and cooling, the residue is extracted with several portions of ether and the extract washed with water until neutral. Replacement of the ether with ethanol and the addition of water to turbidity gives broad white plates of methyl 6-methoxydehydroabietate in a pure state. The yield in three crops has been 2.1 g. (168%) M. P. 65–66°.

The above treatment has been repeated and the methoxy ester of the same melting point obtained, again in 68% yield.

I claim:

1. A process for methylating methyl 6-hydroxydehydroabietate which comprises reacting methyl-6-hydroxydehydroabietate with dimethyl sulfate in an aqueous alcoholic solution of an alkali metal hydroxide.

2. A process according to claim 1 in which the ratio of water to alcohol in said solution is in the neighborhood of 50–50, by volume.

3. A process for methylating methyl 6-hydroxydehydroabietate which comprises reacting methyl 6-hydroxydehydroabietate with dimethyl sulfate in a solution of an alkali metal hydroxide in a mixture of approximately equal parts by weight of water and a water soluble lower alcohol.

4. A process for methylating methyl 6-hydroxydehydroabietate which comprises separately preparing and then intermixing a solution of methyl 6-hydroxydehydroabietate in an alcohol and a solution of an alkali metal hydroxide in water, adding dimethyl sulfate to the mixed solutions, and heating to refluxing temperature.

5. A process for methylating methyl 6-hydroxydehydroabietate which comprises separately preparing and then intermixing a solution of methyl 6-hydroxydehydroabietate in a water soluble lower alcohol and a solution of an alkali metal hydroxide in water, adding dimethyl sulfate to the mixed solutions, and heating to refluxing temperature.

HAROLD H. ZEISS.

REFERENCES CITED

The following references are of record in the file of this patent:

UNITED STATES PATENTS

| Number | Name | Date |
| --- | --- | --- |
| 2,359,826 | Campbell | Oct. 10, 1944 |

OTHER REFERENCES

Fieser, "Organic Chemistry," 1944, p. 994.

Certificate of Correction

Patent No. 2,450,706.　　　　　　　　　　　　　　　　　October 5, 1948.

HAROLD H. ZEISS

It is hereby certified that error appears in the printed specification of the above numbered patent requiring correction as follows:

Column 3, line 40, for "(168%)" read *(68%)*;

and that the said Letters Patent should be read with this correction therein that the same may conform to the record of the case in the Patent Office.

Signed and sealed this 28th day of December, A. D. 1948.

[SEAL]

THOMAS F. MURPHY,
*Assistant Commissioner of Patents.*